United States Patent [19]

Aldrich

[11] Patent Number: 4,534,524
[45] Date of Patent: Aug. 13, 1985

[54] POSITION AND CONTROL SYSTEM FOR HELICOPTER BLADE ACTUATION

[75] Inventor: Allyn M. Aldrich, Rockford, Ill.

[73] Assignee: Sundstrand Corporation, Rockford, Ill.

[21] Appl. No.: 539,119

[22] Filed: Oct. 5, 1983

[51] Int. Cl.³ .............................................. B64C 27/605
[52] U.S. Cl. ................................ 244/17.25; 416/160; 416/170 R
[58] Field of Search ............... 244/17.10, 17.25, 17.13; 416/160, 170, 157 A

[56] References Cited

U.S. PATENT DOCUMENTS

| | | | |
|---|---|---|---|
| 1,716,134 | 6/1929 | Huguenin | 416/160 |
| 1,999,091 | 4/1935 | Ebert | 416/160 |
| 2,224,640 | 12/1940 | Bonawit | 416/160 |
| 2,417,176 | 3/1947 | Ratie | 416/160 |
| 2,487,836 | 11/1949 | Turnbull | 416/160 |
| 3,893,789 | 7/1975 | Andrews | 416/160 |

*Primary Examiner*—Galen Barefoot
*Attorney, Agent, or Firm*—Wood, Dalton, Phillips, Mason & Rowe

[57] ABSTRACT

A helicopter blade position and control mechanism including a hollow rotor shaft for mounting a plurality of rotor blades with provision for pitch adjustment. A control shaft is disposed within the rotor shaft and is rotatable relative thereto and is associated with actuators for the blades such that the pitch of the blades is changed when the control shaft rotates relative to the rotor shaft. A planetary gear assembly interconnects the control shaft and a source of power fixed to the helicopter fuselage and is such that when an input to the planetary gear assembly is quiescent, the control shaft will rotate in the same direction and at the same rate as the rotor shaft to maintain a desired blade pitch. Conversely, when an input is placed on the planetary gear system, relative rotation between the control shaft and the rotor shaft will occur to provide the desired adjustment in blade pitch. The system allows accurate blade position feedback signals to be taken from a feedback device stationarily mounted on the fuselage.

3 Claims, 2 Drawing Figures

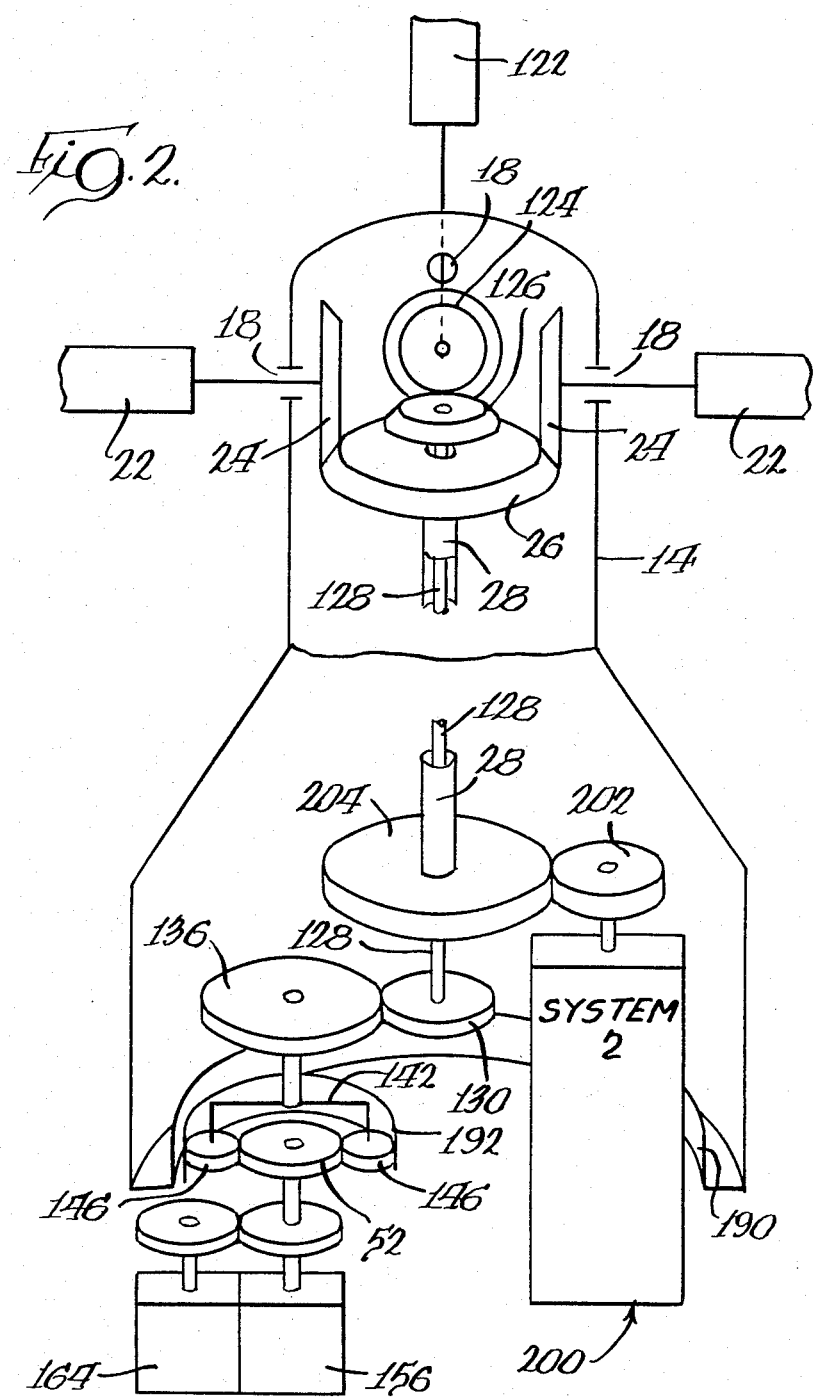

POSITION AND CONTROL SYSTEM FOR HELICOPTER BLADE ACTUATION

FIELD OF THE INVENTION

This invention relates to helicopter controls, and more particularly, to a position and control system for the actuators employed to rotate helicopter blades on their longitudinal axis to vary pitch, and thus lift.

BACKGROUND OF THE INVENTION

As is well known, helicopter rotor blades must be rotated about their longitudinal axis to vary their lift. Achieving this function is difficult since the blades are mounted on a rotating shaft and thus are not only rotating about their own longitudinal axes, but a hub as well. Consequently, considerable complexity is required to convey power from a source fixed on the helicopter fuselage to rotate the blades in a controlled manner. It is even more difficult to get accurate position feedback of the rotative position of the blades back to the helicopter fuselage.

Heretofore, such control has been primarily accomplished through mechanical linkages extending through the actuators with position feedback signals being taken from the rotor head. The various configurations proposed are quite functional but have several drawbacks. The principal drawback is that of the need for a complicated linkage for driving the blades, in a controlled fashion, about their longitudinal axes. potential methods for performing this function include the use of electrical circuits having slip rings to transmit electrical power from a power source fixed in the helicopter fuselage to electrical actuators for the blades, pneumatic rotating joints to transmit fluid under pressure for actuating purposes, and in some limited instances, the use of hydraulic connectors to transmit hydraulic fluid under pressure. While possible, such methods are ineffectual and are more prone than is desired to partial or total failure.

A second drawback resides in such prior art systems of transmitting a position feedback signal from the actuator through a rotating joint to the control system for the rotor which typically is mounted on the fuselage. Slip rings provide very poor electrical feedback signals with the consequence that the ability to control the actuators positioning the blades cannot operate with the accuracy desired.

The present invention is directed to overcoming one or more of the above problems.

SUMMARY OF THE INVENTION

It is the principal object of the invention to provide a new and improved position and control mechanism for the rotor blades of a helicopter. More specifically, it is an object of the invention to provide such a mechanism or system wherein failure prone rotary joints are avoided and/or wherein accurate feedback signals to a fixed portion of the control system are provided.

An exemplary embodiment of the invention achieves the foregoing objects in a system including a rotor shaft which is adapted to be journalled on a helicopter fuselage and which may mount, with provision for pitch adjustment, a plurality of rotor blades. An actuator for each of the blades is rotatably mounted in the rotor shaft and is adapted to controllably alter the pitch of the associated blade upon rotation relative to the rotor shaft. The actuators are rotatable with the rotor shaft.

At least one control shaft which is rotatable relative to the rotor shaft and generally parallel thereto is provided and is operatively associated with at least one of the actuators for rotating the same upon rotation of the control shaft relative to the rotor shaft. A gear assembly including at least three gears defining a gear train is provided and a drive unit adapted to be mounted on a helicopter fuselage in fixed relation thereon relative to the rotor shaft is included. One of the gears is connected to the drive unit to be selectively driven thereby. Another of the gears is associated with the rotor shaft to be driven thereby while the remaining gear is connected to the control shaft to drive the same. The gear assembly is constructed and arranged such that when the one gear is not being driven by the drive unit, the control shaft will rotate in the same direction and the same rate as the rotor shaft and when the one gear is being driven by the drive unit, the control shaft will rotate relative to the rotor shaft to controllably alter the pitch of at least one of the blades.

In a highly preferred embodiment, a feedback device is adapted to be mounted on a helicopter fuselage in fixed relation thereon relative to the rotor shaft and is connected to the drive unit to be driven thereby and to produce a signal representative of the pitch of at least one of the blades.

Because a large portion of the system is mechanical, employing gears and shafts, failure prone rotary joints are avoided. Similarly, because the feedback device is mounted on the fixed portion of the fuselage, accurate signals may be obtained therefrom by eliminating the need for slip rings or the like.

In a highly preferred embodiment, the gear assembly is a planetary gear assembly including a sun gear, a ring gear, and at least one planet gear and associated carrier. The invention also contemplates that in some instances, there may be at least two of the control shafts for operating corresponding actuators and a corresponding number of gear assemblies and drive units. Preferably, the rotor is hollow and the control shaft or shafts are disposed therein in coaxial relation to the rotor shaft.

Other objects and advantages will become apparent from the following specification taken in connection with the accompanying drawings.

DESCRIPTION OF THE DRAWINGS

FIG. 2 is a view similar to FIG. 1 but illustrating a modified embodiment of the invention where a plurality of control shafts are employed.

DESCRIPTION OF THE PREFERRED EMBODIMENT

Figure 1:
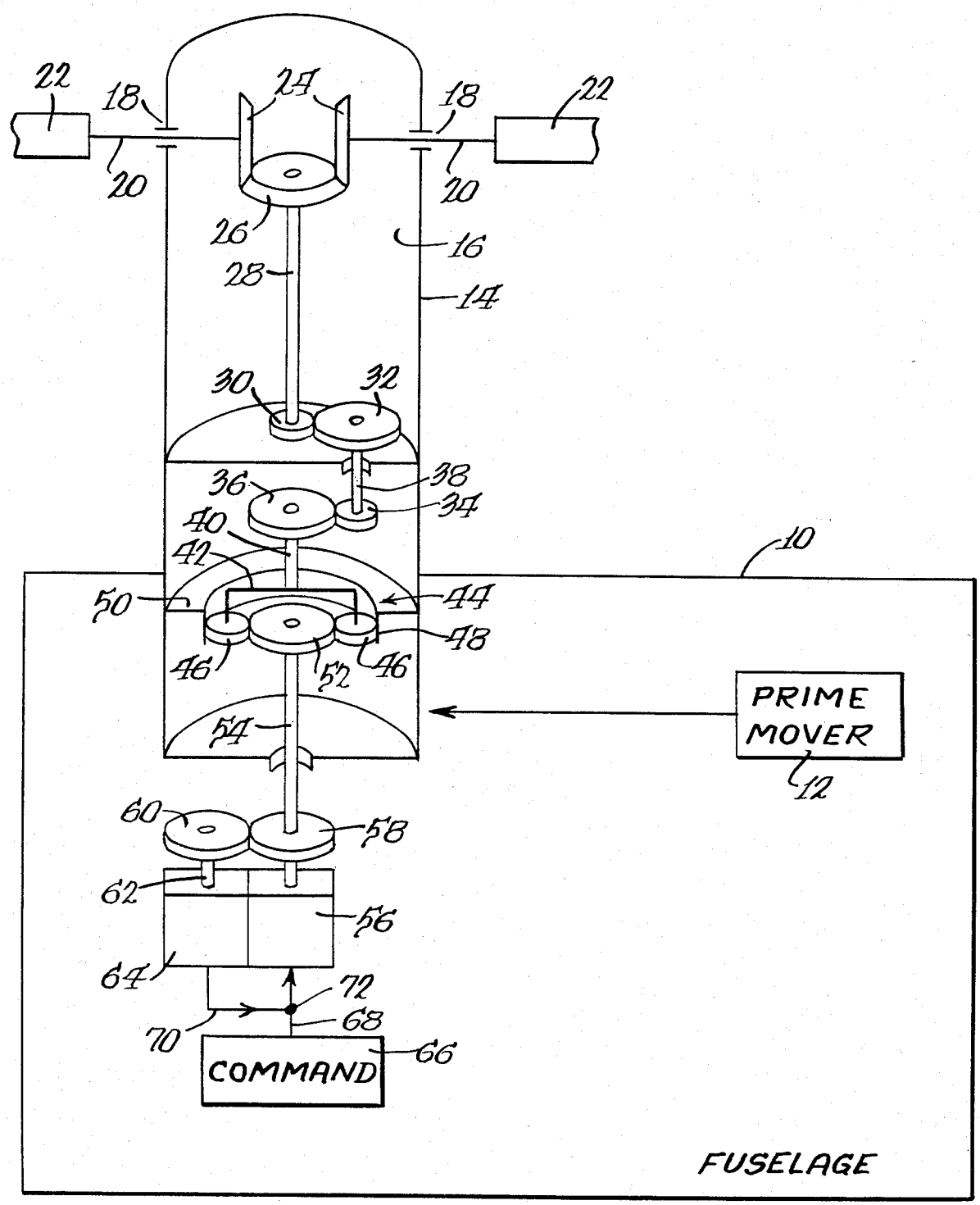
FIG. 1 is a somewhat schematic, perspective view of a rotor blade position and control system made according to the invention with parts broken away for clarity.

An exemplary embodiment of a position and control system for helicopter blades is illustrated in FIG. 1 and is seen to include a helicopter fuselage, shown schematically at 10, housing a prime mover 12 such as an internal combustion engine, turbine or the like. Journalled on the fuselage 10 by any suitable bearings (not shown) is an upright rotor shaft 14 which, as seen in FIG. 1, includes a hollow interior 16. Near the upper end of the rotor shaft 14, bearings 18 are provided for journalling actuator shafts 20 extending to helicopter blades 22.

The rotational axis of the actuator shafts 20 is, of course, nonparallel to the rotational axis of the rotor shaft 14 and generally, but not always, will intersect the latter.

Within the hollow rotor shaft 14, each actuator shaft 20 terminates in a respective bevel gear 24. The bevel gears 24 are in turn meshed with a bevel gear 26 on the end of an upright control shaft 28 within the hollow interior 16 of the rotor shaft 14 coaxial with the axis of rotation of the latter.

The control shaft 28 is journalled for rotation within the rotor shaft 14 by any suitable bearings (not shown) and at its end opposite the bevel gear 26, terminates in a spur gear 30 which, together with gears 32, 34 and 36 form a speed change gear system.

The gear 32 is meshed with the gear 30 and is on a shaft 38, suitably journalled within the rotor shaft 14 also mounting the gear 34. The gear 34 is in turn in mesh with the gear 36 and, for purposes that will be seen, the arrangement is such that the gear 30, and thus the control shaft 28, will rotate at twice the rate of the gear 36.

The gear 36 is mounted on a suitably journalled shaft 40 which extends to the carrier 42 of a planetary gear assembly, generally designated 44. The carrier 42 journals a plurality of planet gears 46 which are meshed with a ring gear, shown schematically at 48, mounted by any suitable means as, for example, a web 50 to the interior surface of the rotor shaft 14. Thus, for each revolution of the rotor shaft 14, the ring gear 48 will rotate an equal amount.

The planetary gear system 44 is completed by a central sun gear 52 meshed with the planet gears 46. The sun gear 52 is disposed on the end of a shaft 54 which extends exteriorly of the rotor shaft 14 to a conventional power drive unit 56. The shaft 54 also mounts a gear 58 meshed with a gear 60 on the input shaft 62 of a position feedback signalling device 64 of conventional construction. Both the power drive unit 56 and the position feedback device 64 are mounted fixedly on the fuselage in relation to the rotor shaft 14. In other words, neither the power drive unit 56 or the position feedback device 64 rotates with the rotor shaft 14.

An input or command device 66 is likewise located in the fuselage and, by conventional means, is adpated to provide an output signal on a line 68 to the power drive unit 56. The signal placed on the line 68 is representative of a desired pitch that the blades 22 are to assume and/or maintain.

The position feedback device provides an output signal on a line 70 that is representative of the then existing pitch of the blades 22 and such signal is joined with the signal on the line 68 at a summing junction 72. When the two signals cancel, as is well known, the actual position and commanded position are identical and the power drive unit 56 will be deenergized. However, when the two are unequal, a signal other than zero will remain at the summing junction 72 and the power drive unit 56 will be appropriately driven to adjust the pitch of the blades 22 until such time as the actual position is equal to the commanded position. Convetioanl servo systems, including controls and drive units can be employed and the foregoing description is simply illustrative of their well known operation.

Operation of the system is as follows. If the commanded positions and actual positions are the same, the power drive unit 56 would be de-energized and the shaft 54, and thus the sun gear 52 will be stationary. The prime mover 12 will be driving the rotor shaft 14 in a given direction and as a consequence, the ring gear 48 will be rotating in that direction. Because the planet gears 46 are meshed with the stationary sun gear 52 and the moving ring gear 48, they will likewise rotate and drive the carrier 42 in the same direction as the direction of rotation of the ring gear 48 but at half the rate. Consequently, the gear 36, connected to the carrier 42, will be rotating at one half the rate of the rotor shaft 14 but in the same direction. The gear speed change assembly including the gears 30, 32, 34 and 36 is, it will be recalled, such that the rate of rotation of the gear 30 will be twice that of the gear 36 and in the same direction. Consequently, the control shaft 28 will be rotating in the same direction as the rotor shaft 14 and at the same rate. Thus, there will be no relative rotation of the actuator shafts 20 relative to the rotor 14 and the pitch of the blades 22 will remain as commanded.

In the event an error signal is generated at the summing junction 72, as by a change in command, the shaft 54 will rotate in one direction or the other depending upon the polarity of the error signal. At this time, due to the fact that the sun gear 52 will now be rotating in one direction or the other, the rate of rotation of the carrier 42 will either be increased above or decreased below its normal rate of rotation, one half the rate of rotation of the rotor shaft 14. This, in turn, will cause the control shaft 28 to either rotate faster or slower than the rotor shaft 14 such that the bevel gear 26 will drive the bevel gears 24 to cause equal changes in pitch of both of the blades 22. When the desired position is obtained, the error signal will be reduced to zero and the power drive unit 56 will cease driving the sun gear 52 and the now attained pitch will be maintained.

It will be particularly appreciated that since all components are interconnected by gears, and all gear ratios are known, a feedback signal representative of the actual position of the blades 22 need not be taken from the blades or the actuator shafts 20, but rather, can be taken from any point in the drive control system. Thus, this feature of the invention enables the feedback to be taken from any stationarily mounted part of the overall system. This, in turn, increases the accuracy of the control system since noise producing instrumentalities such as slip rings are avoided.

The invention also contemplates individual adjustment of blades by plural control systems. An embodiment of this form of the invention is illustrated in FIG. 2 and like components are given like reference numerals for simplicity. It will be observed that the system is illustrated in FIG. 2 includes an additional rotor blade 122 and associated bevel gear 124. The control shaft 28 is made hollow and an additional control shaft 128 is disposed within the control shaft 28 to mount a bevel gear 126 in engagement with the bevel gear 124.

The shaft 128 is connected via a gear 130 to a gear 136 connected to a carrier 142 for planet gears 146. The planet gears 146 are meshed with a sun gear 52 which in turn is connected to a power drive unit 156 and a position feedback mechanism 164 generally as in the embodiment previously described.

Mounted on the interior of the rotor shaft 14 is a large ring gear 190 which is meshed with a smaller ring gear 192 journalled in any suitable fashion within the rotor 14. This is accomplished by providing teeth on the exterior of the ring gear 192. The ring gear 192 is also meshed with the planets 146 and serves the same function as the ring gear 48 described previously.

A second system, generally designated 200 and identical to that just described is employed to drive the shaft 28 by gears 202 and 204.

Operation of the embodiment illustrated in FIG. 2 is generally identical to that shown in FIG. 1 save for the fact that the drive unit 156 and associated components controls the pitch of the blade 122 (and any companion blade that may be ultimately geared to the bevel gear 126) while the system 200 controls the pitch of the blades 22. Gear ratios between the gears 130 and 136 and the gears 202 and 204 are selected so that when the associated power drive unit is quiescent, the shafts 28 and 128 will rotate in the same direction and at the same rate as the rotor shaft 14. The particular ratio selected will be dependent upon the rate of rotation of the ring gear 192 with respect to the ring gear 190. Because the former is smaller than the latter, it will be rotating at a rate greater than the rate of rotation of the rotor shaft 14 and compensation for this fact is attained through appropriate selection of the gear ratios between the gears 130 and 136 and the gears 202 and 204.

It will, of course, be appreciated that using the principles illustrated in FIG. 2, a number of control shafts in excess of two may be employed as desired.

From the foregoing, it will be appreciated that a helicopter blade position and control system made according to the invention provides numerous advantages over the prior art. Accurate feedback control is reliably obtained. Complex linkages are avoided as are troublesome rotary joints for the conveying of electrical, pneumatic, or hyraulic power.

Moreover, those skilled in the art will recognize that the blade position and control system of the invention is not restricted to use in helicopters. For example, the rotor shaft could be the driving shaft (or engine mainshaft) for a variable pitch propeller with the blades subject to pitch adjustment being the propeller blades. Similarly, the rotor shaft could be that of a turbine with the blades being the turbine rotor blades or vanes. Thus, no limitation to helicopter rotor systems is intended except as expressly stated in the appended claims.

Other advantages will be immediately recognized by those skilled in the art.

I claim:

1. A position and control mechanism for use in an aircraft comprising:
    a hollow rotor shaft adapted to be journalled on a aircraft fuselage, to be driven by a prime mover, and mount, with provision for pitch adjustment, a plurality of blades;
    a plurality of bevel gears, one for each of said blades, rotatably mounted in said rotor shaft and adapted to controllably alter the pitch of the associated blade upon rotation relative to said rotor shaft, said bevel gears being connected to said blades and being rotatable with said rotor shaft;
    at least one control shaft within said rotor shaft and rotatable relative thereto, said control shaft mounting a drive gear in engagement with at least one of said bevel gears for rotating the same upon rotation of said control shaft relative to said rotor shaft;
    a planetary gear assembly including a ring gear, a sun gear, and at least one planet gear and associated carrier;
    a speed change gear assembly within said rotor shaft including first, second, third and fourth gears, said second and third gears being affixed to a common shaft rotatable within said rotor shaft and meshed respectively with said first and fourth gears, said gears being dimensioned such that said fourth gear rotates at a greater rate than said first gear;
    a drive unit adapted to be mounted on a fuselage in fixed relation thereon relative to said rotor shaft;
    said sun gear being connected to said drive unit to be selectively driven thereby;
    said ring gear being fixed to said rotor shaft to be driven thereby;
    said carrier being connected to said first gear to drive the same;
    said fourth gear being connected to said control shaft;
    said gear assemblies being constructed and arranged such that when said sun gear is not being driven by said drive unit, said control shaft will rotate in the same direction and the same rate as said rotor shaft and when said sun gear is being driven by said drive unit, said control shaft will rotate relative to said rotor shaft to controllably alter the pitch of at least one of said blades.

2. The position and control mechanism of claim 1 further including a feedback device adapted to be stationarily mounted on the fuselage and connected to said drive unit between said drive unit and planetary gear assembly.

3. A position and control mechanism for use in an aircraft comprising:
    a hollow rotor shaft adapted to be journalled on a helicopter fuselage, to be driven by a prime mover, and mount, with provision for pitch adjustment, a plurality of blades;
    a plurality of actuators including spaced bevel gears, one for each of blades, rotatably mounted in said rotor shaft and adapted to controllably alter the pitch of the associated blade upon rotation relative to said rotor shaft, said actuators being rotatable with said rotor shaft;
    at least two control shafts within said rotor shaft and rotatable relative thereto and relative to each other, each said control shaft having a bevel gear meshed with the bevel gear of at least one of said actuators for rotating the same upon rotation of said control shaft relative to said rotor shaft;
    a gear assembly for each of said control shafts, each including a ring gear, a sun gear, and at least one planet gear and associated carrier;
    a further large ring gear fixed to and within said rotor shaft for rotation therewith;
    a drive unit for each of said control shafts, each adapted to be mounted on a fuselage in fixed relation thereon relative to said rotor shaft;
    the sun gear in each assembly being connected to a corresponding one of said said drive units to be selectively driven thereby;
    the ring gears in each assembly being within and in engagement with said large ring gear to be driven thereby;
    the planetary gear in each assembly being connected to the corresponding one of said control shafts to drive the same;
    said gear assemblies being constructed and arranged such that when said sun gear is not being driven by the corresponding drive unit, the corresponding control shaft will rotate in the same direction and the same rate as said rotor shaft and when said one gear is being driven by the corresponding drive unit, the corresponding control shaft will rotate relative to said rotor shaft to controllably alter the pitch of at least one of said blades.

* * * * *